(12) United States Patent
Tamura (10) Patent No.: US 7,337,145 B2
(45) Date of Patent: Feb. 26, 2008

(54) E-MONEY MANAGING METHOD AND SYSTEM, E-MONEY MANAGING/HOLDING MEDIUM, COMPUTER-READABLE RECORDING MEDIUM IN WHICH E-MONEY MANAGING PROGRAM IS RECORDED, E-VALUE MANAGING/HOLDING MEDIUM, AND E-VALUE MANAGING METHOD

(75) Inventor: Tomohiko Tamura, Kumagaya (JP)

(73) Assignee: Fujitsu Limited, Kawasaki (JP)

( * ) Notice: Subject to any disclaimer, the term of this patent is extended or adjusted under 35 U.S.C. 154(b) by 1232 days.

(21) Appl. No.: 09/820,979

(22) Filed: Mar. 30, 2001

(65) Prior Publication Data

US 2002/0019806 A1 Feb. 14, 2002

(30) Foreign Application Priority Data

Aug. 3, 2000 (JP) ............................. 2000-235917

(51) Int. Cl.
*G06Q 40/00* (2006.01)
(52) U.S. Cl. ............................ 705/41; 705/39; 705/44; 235/380
(58) Field of Classification Search .................. 705/26, 705/29, 39–44; 235/380, 381
See application file for complete search history.

(56) References Cited

U.S. PATENT DOCUMENTS 4,650,978 A * 3/1987 Hudson et al. ............. 235/380
6,422,462 B1 * 7/2002 Cohen ........................ 235/381
6,816,721 B1 * 11/2004 Rudisill ...................... 455/406

FOREIGN PATENT DOCUMENTS

| EP | 0 910 052 A2 | 4/1999 |
| EP | 0 949 593 A2 | 10/1999 |
| EP | 0 962 875 A2 | 12/1999 |

(Continued)

OTHER PUBLICATIONS

Reid, Bruce. "AT&T and Universal Bank Announces Industry Growth Record of AT&T Universal Card." Business Wire. New York: Aug. 13, 1990. Sec. 1. p. 1.*

(Continued)

*Primary Examiner*—Hani M. Kazimi
*Assistant Examiner*—Dan Kesack
(74) *Attorney, Agent, or Firm*—Kratz, Quintos & Hanson, LLP (57) ABSTRACT

With an electronic money managing system using an electronic-money medium, a user is freed from worrying about a balance in the medium, avoiding unnecessary spending. The system has a medium storing e-money that is spent for payments by a payment section in response to charging by a charging section. A minimum balance setting section sets in the medium an amount payable only for a particular purpose as a minimum balance. A purpose judgment section discriminates whether or not a payment is for the particular purpose. A balance judgment section discriminates whether or not a total balance of electronic money remaining in the medium after the payment is smaller than the minimum balance. A control section controls so as to prohibit the payment, if the result of the discrimination by the purpose judgment section is negative and also if the result of the discrimination by the balance judgment section is positive.

29 Claims, 9 Drawing Sheets

FOREIGN PATENT DOCUMENTS

| | | |
|---|---|---|
| EP | 0878784 A3 | 2/2000 |
| EP | 0962875 A3 | 4/2000 |
| JP | 09-204484 | 8/1997 |
| JP | 09-259193 | 10/1997 |
| JP | 09-293108 | 11/1997 |
| JP | 10-105627 | 4/1998 |
| JP | 10-228515 | 8/1998 |
| JP | 10-232967 | 9/1998 |
| JP | 11-31190 | 2/1999 |
| JP | 11-120264 | 4/1999 |
| JP | 11-353397 | 12/1999 |
| JP | 2000-011066 | 1/2000 |
| JP | 2000-029965 | 1/2000 |
| JP | 2000-099603 | 5/2000 |
| JP | 2000-141964 | 5/2000 |
| JP | 2000-149137 | 5/2000 |
| WO | WO 90/15382 | 12/1990 |
| WO | WO 99/49424 | 9/1999 |

OTHER PUBLICATIONS

Wolpoff, Charles R. "Larger banks find raising fees easier than small banks." Baltimore Journal. Baltimore: Oct. 10, 1997. vol. 15, Iss. 21; p. 25.*

* cited by examiner

FIG. 9

E-MONEY MANAGING METHOD AND SYSTEM, E-MONEY MANAGING/HOLDING MEDIUM, COMPUTER-READABLE RECORDING MEDIUM IN WHICH E-MONEY MANAGING PROGRAM IS RECORDED, E-VALUE MANAGING/HOLDING MEDIUM, AND E-VALUE MANAGING METHOD

BACKGROUND OF THE INVENTION

1. Field of the Invention

The present invention relates to an e-money (hereinafter also called "e-money") managing method and system suitable for use in managing/holding e-money, which is defined as an electronic alternative to a currency. The invention also relates to an e-money managing/holding medium, a computer-readable recording medium in which an e-money managing program is recorded, an electronic value (hereinafter also called "e-value") managing/holding medium, and an e-value managing method.

2. Description of the Related Art

IC cards having an integrated circuit (IC) embedded therein have been popular as an electronic money managing/holding medium used in e-money managing systems.

The IC cards are equipped with a data memory for storing (loading) e-money, which serves as an alternative to cash, to be spent in payments. Compared to credit cards, the IC cards carry advantages of being free of arrears and of improved security guaranteed by security functions being added.

Nowadays, there are put into the market IC cards in which e-money is stored, depending on the purposes of its spending, in two or more storage areas separately provided on the data memory.

In these conventional systems, however, an external apparatus such as a reader is required to check what amount of money is left in the IC card, and it is thus likely that a user might spend all the e-money in the IC card without such intention. So, the user must always be worrying about the balance remaining in the IC card in order to keep some amount left therein, avoiding unnecessary spending.

In the conventional systems having two or more storage areas on the data memory each for storing e-money to be paid for some particular use, there is another issue that the e-money thus stored is such restricted in uses that the flexibility is significantly impeded.

SUMMARY OF THE INVENTION

With the foregoing problems in view, one object of the present invention is to provide an electronic money (hereinafter also called "e-money") managing method in which a minimum balance of e-money (hereinafter also called "minimum balance") is held in the medium so that the certain amount is always left therein to be spent for a predetermined use, allowing a user to spend the e-money in the medium being free from worrying about the amount (balance) still left in the medium, avoiding unnecessary spending.

Another object of the invention is to provide a system for carrying out the above-mentioned method.

Further objects of the invention are to provide an e-money managing/holding medium, a computer-readable recording medium having an e-money managing program recorded thereon, an e-value managing/holding medium, and an e-value managing method.

In order to accomplish the above object, according to the present invention, there is provided a method of managing electronic money, which is defined as an electronic alternative to a currency, stored in a medium, comprising the steps of: (a) setting an amount of electronic money (hereinafter also called "amount") payable only for a particular purpose as a minimum balance in the medium; (b) discriminating whether or not a payment is for the particular purpose, when making the payment; (c) discriminating whether or not a total balance of electronic money (hereinafter also called "total balanced") remaining in the medium after the payment is smaller than the minimum balance; and (d) prohibiting the payment if the result of the discriminating is negative in step (b) and if the result of the discriminating is positive in step (c).

As a generic feature of the present invention, there is provided an electronic money managing system comprising: a medium having a storage section for storing electronic money, which is defined as an electronic alternative to a currency; charging means for making charging by notifying the medium of payment purpose information along with an amount to be paid, which charging means is disposed independently of the medium and is adapted to be communicably connected with the medium; payment means for making a payment in response to the charging by the charging means; minimum balance setting means for setting an amount of electronic money (hereinafter also called "amount") payable only for a particular purpose as a minimum balance in the medium; purpose judgment means for discriminating whether or not the payment is for the particular purpose, based on the payment purpose information received from the charging means, when the payment means makes the payment; balance judgment means for discriminating whether or not a total balance of electronic money (hereinafter also called "total balance") remaining in the medium after the payment is smaller than the minimum balance; and control means for controlling the payment means so as to prohibit the payment if the result of the discrimination by the purpose judgment means is negative and if the result of the discrimination by the balance judgment means is positive.

As another generic feature, there is provided a medium for managing/holding electronic money, which is defined as an electronic alternative to a currency. The medium is adapted to be communicably connected with charging means for making charging by notifying the medium of payment purpose information along with an amount to be paid, to receive charging, and the charging means is disposed independently of the medium. The medium comprises: a storage section for storing electronic money; a payment section for making a payment in response to the charging by the charging means; a minimum balance setting section for setting an amount payable only for a particular purpose as a minimum balance in the medium; a purpose judgment section for discriminating whether or not the payment is for the particular purpose, based on the payment purpose information received from the charging means, when the payment section makes the payment; a balance judgment section for discriminating whether or not a total balance of electronic money (hereinafter also called "total balance") remaining in the medium after the payment is smaller than the minimum balance; and a control section for controlling the payment section so as to prohibit the payment if the result of the discrimination by the purpose judgment section is negative and if the result of the discrimination by the balance judgment section is positive.

As still another generic feature, there is provided a computer-readable recording medium in which an electronic money managing program for instructing a computer to execute a function of managing electronic money is recorded. The electronic money, which is defined as an electronic alternative to a currency, is stored in the medium which is adapted to be communicably connected with charging means for making charging by notifying the medium of payment purpose information along with an amount to be paid, and the charging means is disposed independently of the medium. The electronic money managing program instructs the computer to function as the following: a payment section for making a payment in response to the charging by the charging means; a minimum balance setting section for setting an amount payable only for a particular purpose as a minimum balance in the medium; a purpose judgment section for discriminating whether or not the payment is for the particular purpose, based on the payment purpose information received from the charging means, when the payment section makes the payment; a balance judgment section for discriminating whether or not a total balance of electronic money (hereinafter also called "the total balance") remaining in the medium after the payment is smaller than the minimum balance; and a control section for controlling the payment section so as to prohibit the payment if the result of the discrimination by the purpose judgment section is negative and if the result of the discrimination by the balance judgment section is positive.

As a preferred feature, in the balance discriminating step (c), an amount to be paid is compared with a general balance, which is the amount obtained by subtracting the minimum balance from the total balance, to make the discrimination.

As another preferred feature, in the balance discriminating step (c), the total balance remaining after the payment is compared with the minimum balance, to make the discrimination.

As still another preferred feature, the maximum balance setting step (a) may be carried out when electronic money is loaded on the medium. If the result of the discriminating is positive in the purpose discriminating step (b) and if the result of the discriminating is positive in the balance discriminating step (c), the payment is allowed.

Further, according to the present invention, there is provided a medium for managing/holding an electronic value, which represents an amount of property to be paid or transferred in exchange with goods or services in accordance with the amount. The medium is communicably connected with charging means that demands the medium for a payment or transfer and includes a storage section having an area in which the electronic value is stored, wherein a predetermined minimum value also is recorded in the storage section so that if a balance of the property remaining in the storage section after the payment or transfer is smaller than the predetermined minimum value, the payment or transfer of the property is prohibited.

Furthermore, there is provided a method of managing an electronic value, which is stored in a medium and represents an amount of property to be paid or transferred in exchange of goods or services when charging means disposed independently of the medium makes a demand for payment or transfer. The method comprises the steps of: discriminating whether or not a balance of the property remaining in the medium after the payment or transfer is smaller than a predetermined minimum value; and if the result of the discriminating is positive, prohibiting the payment or transfer of the property.

With this construction, if a payment is for another use than the particular one that has been previously set and if the total balance of e-money after the payment is smaller than the minimum balance, the payment is prohibited. The total balance is thus maintained equal to or greater than the minimum balance even after payments made for any uses other than the particular one.

And, the payment or transfer of e-value (property) is prohibited upon judgment that a balance of e-value remaining in the medium after the payment is smaller than a predetermined value. It is therefore possible to prohibit the payment or transfer of e-value, if the balance in the medium is smaller, even before making a payment or transfer, than the predetermined value.

According to the e-money managing method of the present invention, the e-money managing system, the medium for managing/holding e-money, the computer-readable recording medium having an e-money managing program recorded thereon, the medium for managing/holding e-value, and the method for managing e-value, it is possible to guarantee the following advantageous results:

(1) since the amount of e-money to be paid only for a particular use is set to the medium as a minimum balance, it is possible to keep the certain amount left in the medium, avoiding unnecessary spending. More specifically, it is prevented that all the money, including what should have been set aside for some particular use, is spent out. That is, a user is made free from worrying about what amount of e-money still remains in the medium, thus guaranteeing the improved user friendliness.

(2) Since the minimum balance can be set to the medium at the loading of e-money, it is possible for the user to spend e-money in the medium following a planned manner, thus also guaranteeing the improved user friendliness.

(3) Since the payment or transfer of e-value in the medium is prohibited upon judgment that the balance of e-value is smaller than a predetermined value, it is possible to prohibit the payment or transfer of e-value if the balance is smaller, even before making payments, than the predetermined value, thereby avoiding a user from spending all the e-value out. Accordingly, the user is made free from worrying about what amount of e-money still remains in the medium, thus guaranteeing the improved user friendliness.

Other objects and further features of the present invention will be apparent from the following detailed description when read in conjunction with the accompanying drawings.

DESCRIPTION OF THE PREFERRED EMBODIMENT(S)

Various preferred embodiments of the present invention will now be described in detail below with reference made to relevant accompanying drawings.

(A) First Embodiment

Figure 1:
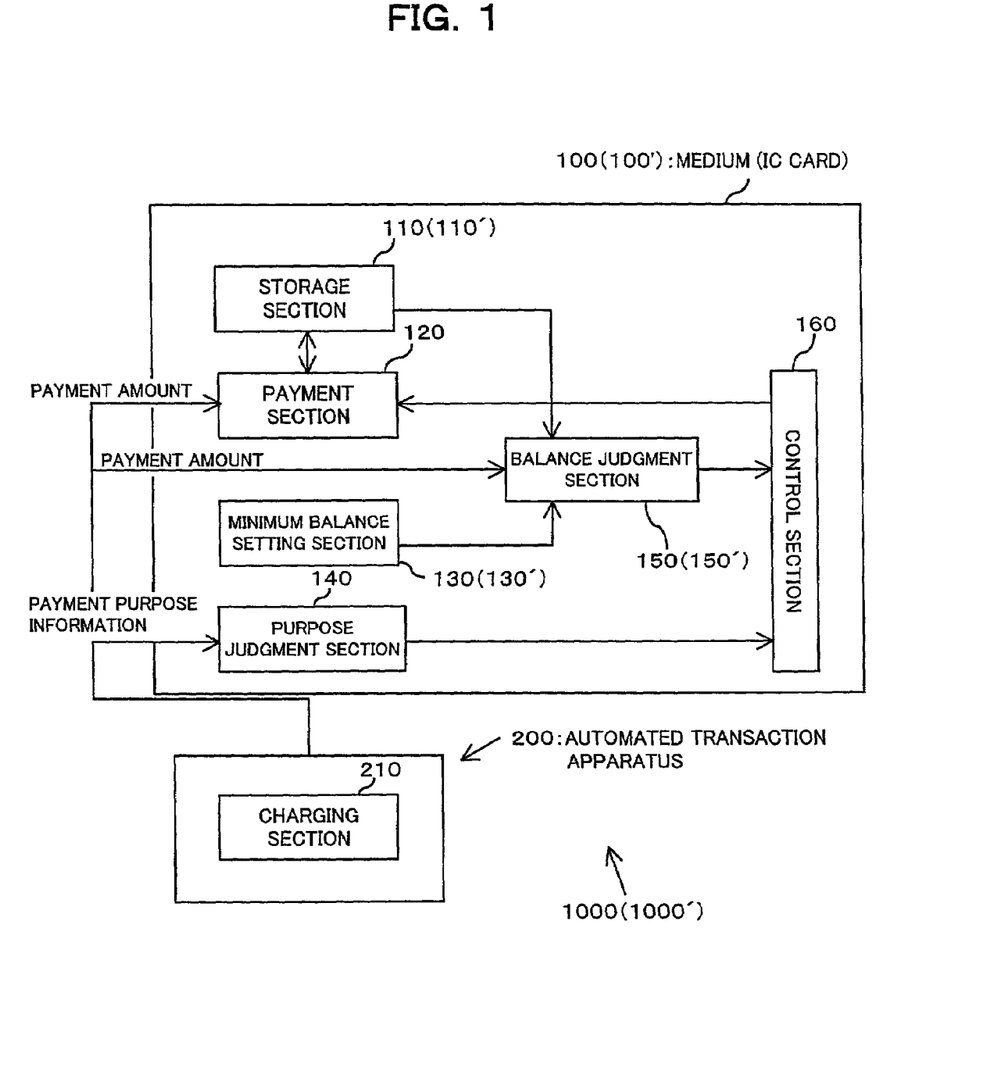
FIG. 1 is a block diagram showing an e-money managing system according to a first embodiment of the present invention.
Figure 2:
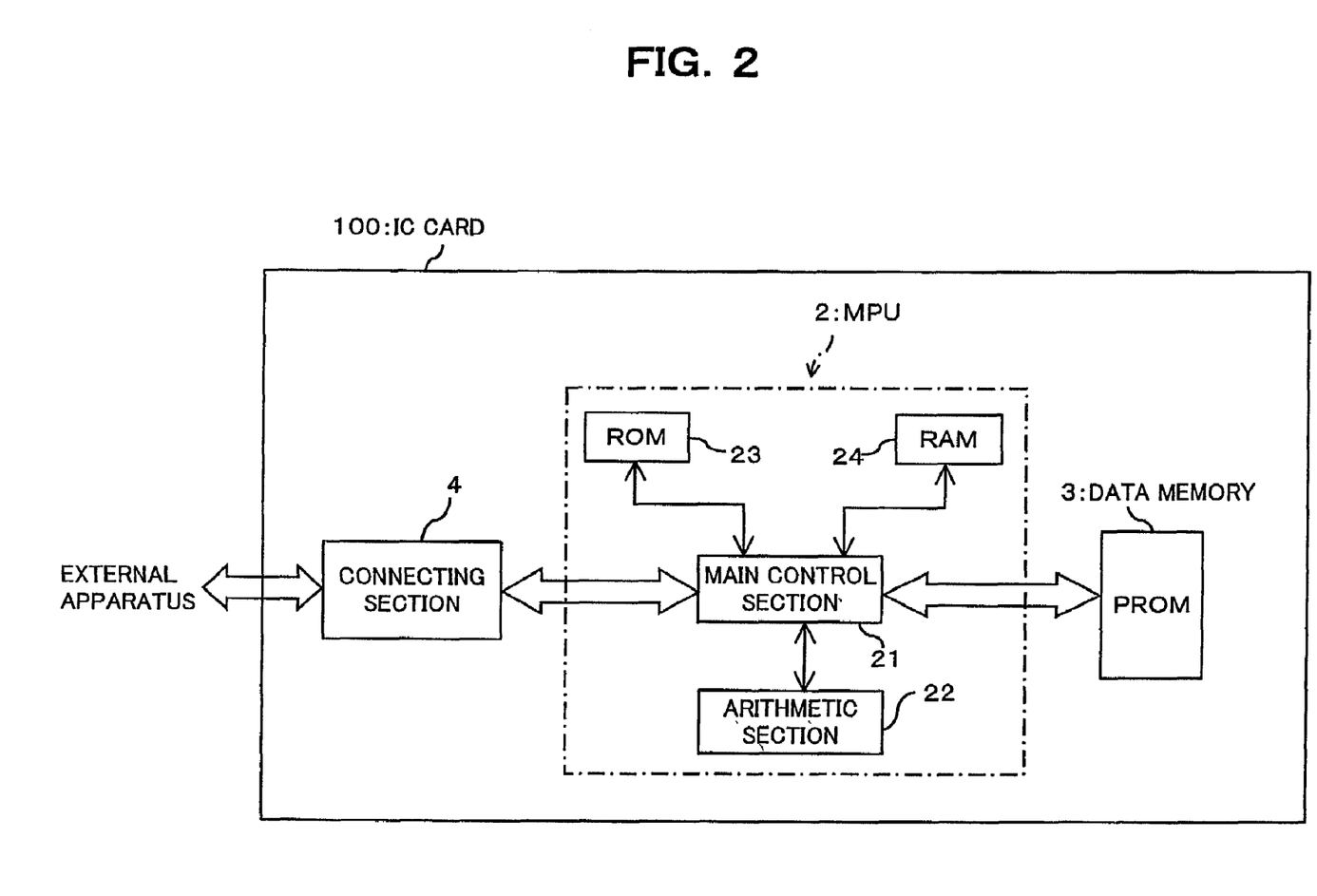
FIG. 2 is a block diagram showing hardware of an IC card, as an example of a medium for managing/holding e-money in the e-money managing system of the first embodiment.

FIG. 1 shows an e-money managing system according to a first embodiment of the present invention. FIG. 2 shows hardware of an IC card as an exemplary medium for managing/holding e-money. The e-money managing system 1000 of FIG. 1 is an apparatus for managing and holding e-money, which is defined as an electronic alternative to a currency, constructed in the form of a combination of an IC card 100 operative as the medium for managing/holding e-money and an automated transaction apparatus 200 (described later).

The IC card 100 functions as a medium (e-money managing/holding medium) having a storage section 110 for storing(recording) e-money in a rewritable manner.

The IC card 100, as shown in FIG. 2, comprises an micro processor unit (MPU) 2, a data memory 3, and a connecting section 4.

The MPU 2 has a read only memory (ROM) 23, a random access memory (RAM) 24, a main control section 21, and a arithmetic section 22. The ROM 23 records a program for driving the main control section 21 and the arithmetic section 22.

For realizing the function of the IC card 100, the main control section 21 and the arithmetic section 22 of the MPU 2 operate in accordance with the program recorded on the ROM 23 as follows: temporarily storing in the RAM 24, e-money loading/unloading data, which is received from the external apparatus (not shown in FIG. 2), and also arithmetic data that is the results of the calculation made by the arithmetic section 22 based on the loading/unloading data; transferring these data to the data memory 3; and transferring the data further to the external apparatus via the connecting section 4.

The data memory 3, which is realized by a programmable ROM (PROM), stores information of an amount (balance) of e-money remained, which is obtained after an arithmetic operation made by the MPU 2. In other words, the data memory 3 is operative to store e-money.

The connecting section 4 is an electrode adapted to be connected to an external apparatus (for example, an IC card reader/writer of the automated transaction apparatus 200 in FIG. 1), via which electrode e-money loading/unloading data is transferred between the IC card 100 and an external apparatus. With this construction, the IC card 100 storing e-money information is connected to the external apparatus via the connecting section 4, thereby the MPU 2 also being connected with the external apparatus. In accordance with an input (instruction) received from the external apparatus, the MPU 2 manipulates information of an amount of e-money stored in the data memory 3.

The IC card 100 is then inserted by a user into a slot of an e-money-enabled ATM of a financial institution to request to issue e-money through the ATM. In response to the request, a host computer of the financial institution subtracts a requested amount of money from the user's account, whereupon issuing the same amount of e-money and storing the issued e-money in the data memory 3 of the IC card 100 through the ATM. Likewise, using ATMs of financial institutions, it is also possible to cash and deposit e-money.

Further, at the loading of e-money on the IC card 100, it is possible to set an amount to be paid only for a particular use as a minimum balance (described later in detail).

The IC card 100 is carried by a user like a purse to be used in various payments. For example, the IC card 100 is inserted into a slot of exclusive automated transaction apparatus 200 (see FIG. 1) located in various premises, such as publicly-managed concourses (horse race, cycle race, auto race, motorboat race, etc.) and pach-inko saloons, to make payments for betting tickets, tolls, foods and drinks, etc., spending-money in the IC card 100.

The automated transaction apparatus 200 has a charging section 210 that sends to an IC card 100, received in the automated transaction apparatus 200, information of an amount charged along with information (purpose information) of a payment purpose.

Meanwhile, the IC card 100 has a storage section 110, a payment section 120, a minimum balance setting section 130, a purpose judgment section 140, a balance judgment section 150, and a control section 160, as shown in FIG. 1.

Like above mentioned, the storage section 110, which corresponds to the data memory 3 of FIG. 2, stores e-money in a rewritable manner.

The minimum balance setting section 130, which is realized by the MPU 2, sets to the IC card 100 a minimum balance as the amount of e-money to be paid only for the particular use.

At the time of loading e-money, for example, an amount to be set as the minimum balance is input through an input device of the above-mentioned ATM. The amount thus input is set to the IC card 100 as the minimum balance by the minimum balance setting section 130.

Specifically, the minimum balance setting section 130 arbitrarily sets to the data memory 3 the amount of e-money to be paid only for the particular use and also what the particular use is.

Although it is preferable that the setting of the minimum balance by the minimum balance setting section 130 is carried out when e-money is loaded on the IC card 100, the setting may alternatively be changed afterward. Moreover, in spite of the user's arbitral setting of the minimum balance and of the particular use, a predetermined value can be alternatively set in advance as an unchangeable value.

Figure 3:
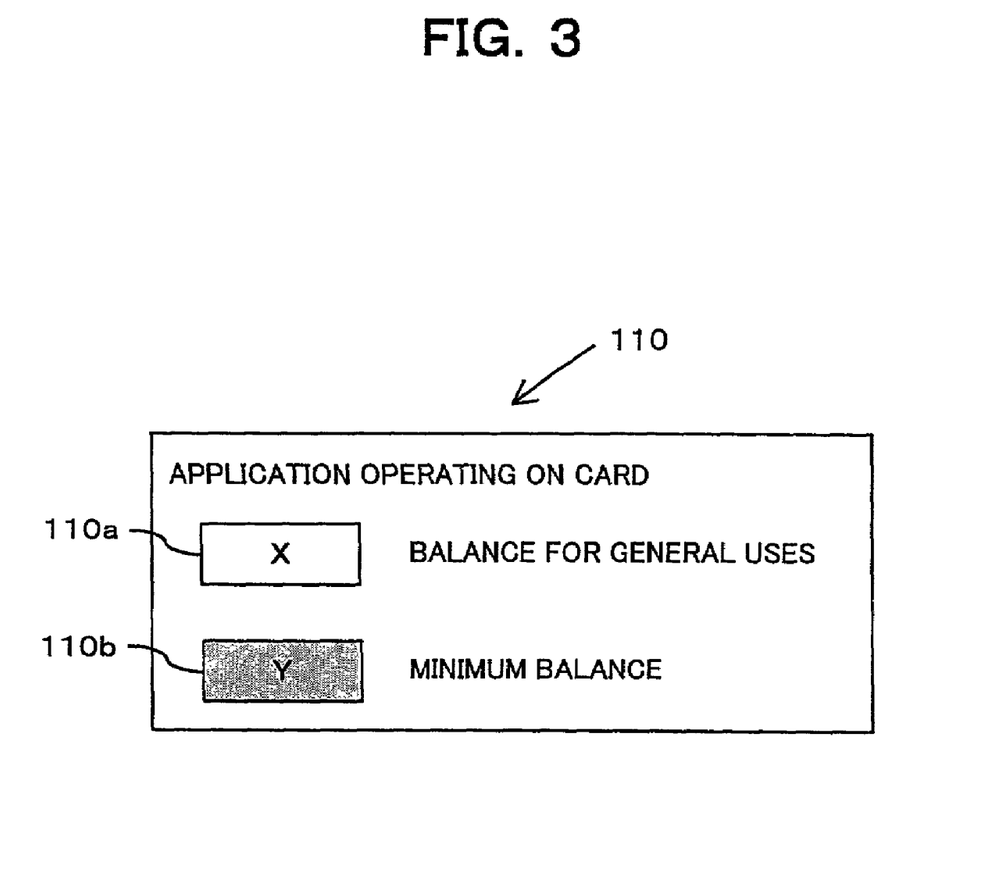
FIG. 3 is a diagram illustrating a manner in which e-money is stored in a storage section of the IC card of the first embodiment.

FIG. 3 shows a manner in which e-money is stored in the storage section 110 of the IC card 100 of the first embodiment. According to the first embodiment, as shown in FIG. 3, the IC card 100 has a storage area 110$b$ storing the e-money to be paid only for a particular use and also another storage area 110$a$ storing the e-money to be paid for any uses without limitation of uses. In FIG. 3, the balance (general balance) of e-money stored in the storage area 110$a$, which money can be spent for any purposes, is designated by the reference character x. Meanwhile, the balance (minimum balance) of e-money in the storage area 110b, which money can be spent only for a particular purpose, is designated by the reference character Y.

The storage area 110a and the storage area 110b formed in the storage section 110 are both realized by the MPU 2 executing a program (intra-card application) stored on the ROM 23.

The amount (minimum balance) Y of e-money stored in the storage area 110b can be set by a user with the minimum balance setting section 130.

The payment section 120, which is realized by the MPU 2 of FIG. 2, completes the payment of e-money in response to charging by the charging section 210 (automated transaction apparatus 200). The payment section 120 subtracts an amount charged by the charging section 210 from the balance in the storage section 110.

When making payments, the payment section 120 preferentially spends out of the storage area 110a (general balance), regardless of the uses of the payments. Only if the general balance is smaller than the amount to be paid and also if the payment is for the particular use, the payment section 120 spends out of the storage area 110b (minimum balance).

At a payment made by the payment section 120, the purpose judgment section 140, which is realized by the MPU 2 of FIG. 2, discriminates whether or not the use of the payment is identical to the particular use having been set, based on payment purpose information received from the charging section 210.

The purpose judgment section 140 compares the particular use, which is recorded in the data memory 3 by the minimum balance setting section 130, with the information of the payment purpose received from the charging section 210 along with the amount charged, and then sends the comparing result to the control section 160.

The balance judgment section 150 discrinilnates whether or not a total balance of e-money remaining in the storage section 110 after the payment is smaller than the minimum balance. Prior to the payment made by the payment section 120, the charged amount notified by the charging section 210 is subtracted from the total balance stored in the storage section 110, thereby calculating in advance the total balance of e-money that will remain after the payment.

Prior to the payment made by the payment section 120, the balance judgment section 150, which is realized by the MPU 2 of FIG. 2, compares the thus calculated total balance remaining after the payment with the minimum balance set in the minimum balance setting section 130 to discriminate whether or not the total balance of e-money remaining after the payment is smaller than the minimum balance.

If the payment is for a use other than the particular use being set, the balance judgment section 150 subtracts the charged amount, which is notified by the charging section 210, from the general balance stored in the storage area 110a of the storage section 110. The balance judgment section 150 then discriminates whether or not the subtraction result is equal to or greater than 0, thereby discriminating whether or not an amount of e-money stored in the IC card 100 suffices for making the payment. After that, the balance judgment section 150 notifies the control section 160 of the discrimination result.

Otherwise if the payment is for the particular use, the balance judgment section 150 subtracts the charged amount, which is notified by the charging section 210, from the general balance stored in the storage area 110a of the storage section 110 and then discriminates whether or not the subtraction result is equal to or greater than 0. The balance judgment section 150 then notifies the control section 160 of the discrimination result.

The control section 160, which is also realized by the MPU 2, controls the payment section 120 in making payments of e-money. If the purpose judgment section 140 judges that the payment is for a use other than the particular use and also if the balance judgment section 150 judges that the total balance remaining alter the payment is smaller than the minimum balance, the control section 160 prohibits the payment section 120 from making the payment. In this manner, the payment of e-money can be stopped.

Alternatively, if the purpose judgment section 140 judges that the payment is for a use other than the particular use and if the balance judgment section 150 judges that the total balance remaining after the payment is equal to or greater than the minimum balance, the control section 160 allows the payment section 120 to make the payment. In this manner, the payment of e-money is allowed to be completed.

Otherwise if the purpose judgment section 140 judges that the payment is for the particular use and if the balance judgment section 150 judges that the total balance remaining after the payment is smaller than the minimum balance, the control section 160 also allows the payment section 120 to make the payment. In this manner, the payment of e-money is allowed to be completed.

Alternatively, if the purpose judgment section 140 judges that the payment is for the particular use and also if the balance judgment section 150 judges that the total balance remaining after the payment is equal to or greater than the minimum balance, the control section 160 prohibits the payment section 120 from making the payment. In this manner, the payment is stopped.

Figure 4:
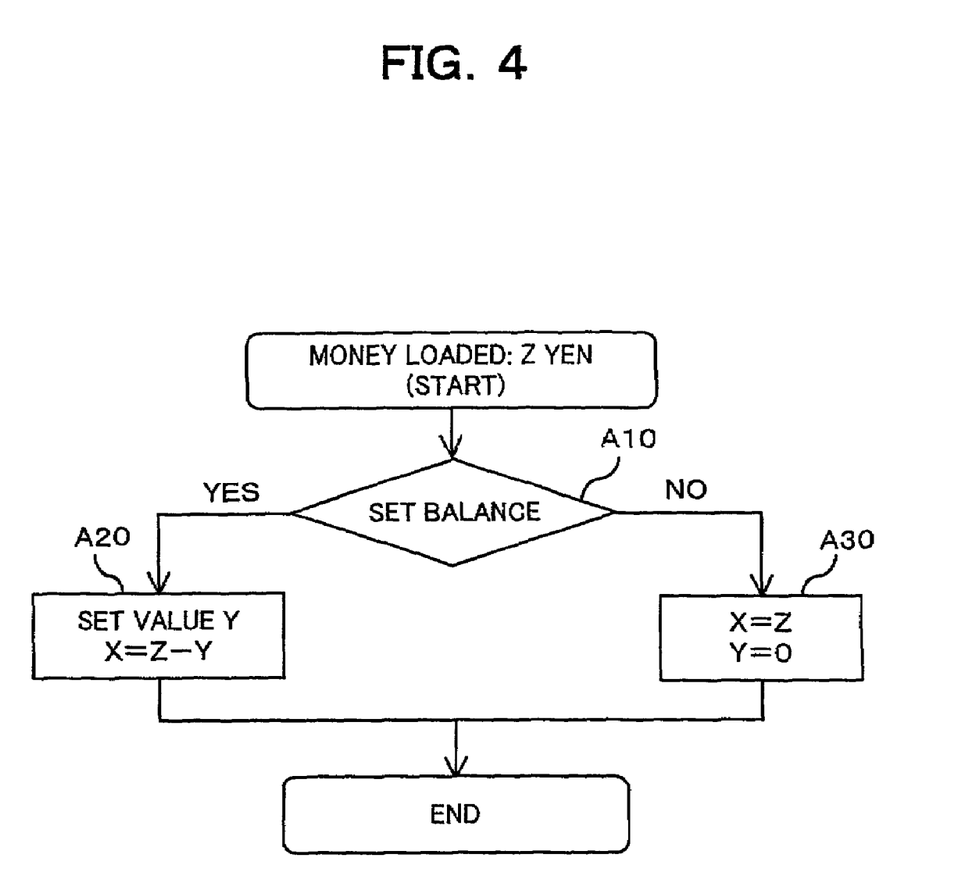
FIG. 4 is a flowchart illustrating a process performed at the loading of e-money to the storage section of the IC card of the e-money managing system of the first embodiment.

An operation performed at the loading of e-money to the storage section 110 of the IC card 100 of the e-money managing system 1000 of the first embodiment, will now be described in detail with reference made to the flowchart (steps A10 through A30) of FIG. 4.

For example, at storing (loading) e-money of Z yen to the storage section 110 of the IC card 100 through an ATM, a user should firstly decide whether to specify the purpose (hereinafter often called "use") of the payment of e-money, or whether to set a minimum balance (step A10).

If decided to specify the use, or if decided to set the minimum balance (YES route of step A10), e-money of Y yen (minimum balance) is stored in the storage area 110b, and e-money of (Z−Y) yen (general balance: X=Z−Y) is stored in the storage area 110a (step A20). In like description, "−" should read as "minus".

Otherwise if decided not to specify the use (NO route of step A10), e-money of Z yen (general balance) is stored in the storage area 110a, with no money being stored in the storage area 110b (X=Z, Y=0) (step A30).

Figure 5:
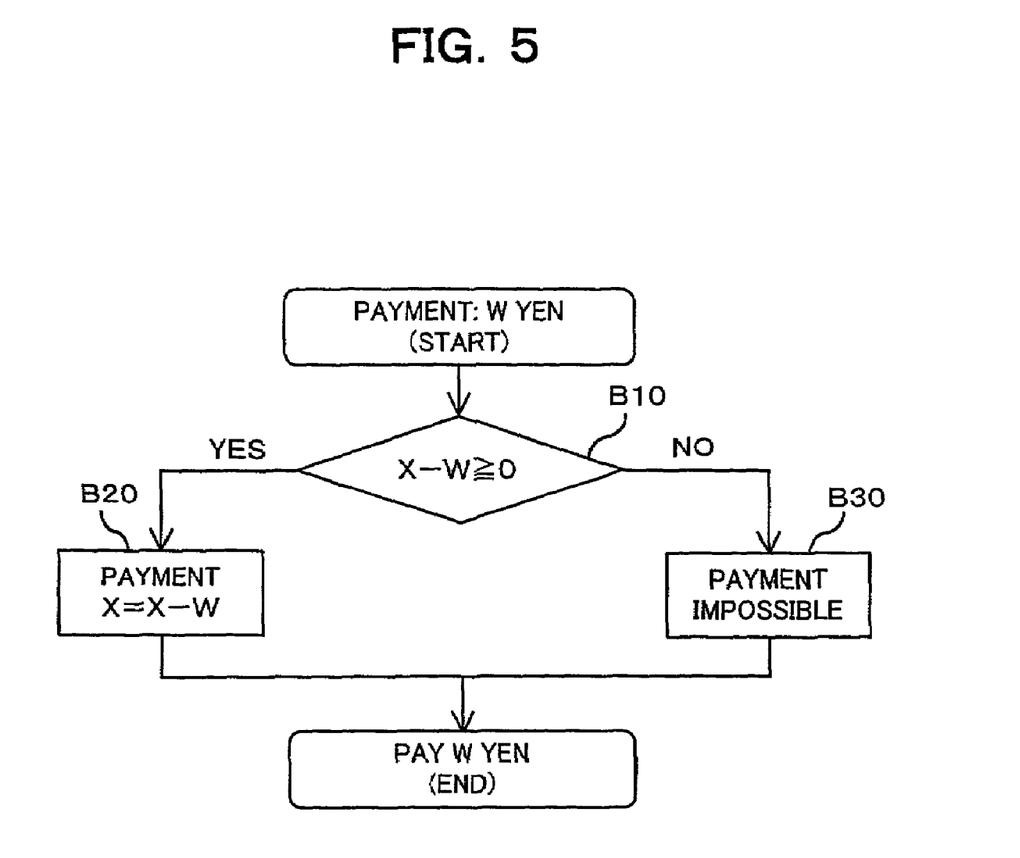
FIG. 5 is a flowchart illustrating a process performed by various elements of the e-money managing system of the first embodiment, when making a payment for another use than a particular use with the IC card in which a minimum balance has been set previously.

Next, with reference made to the flowchart (steps B10 through B30) of FIG. 5, a description will now be made of an operation that is carried out at a payment for another use than the particular use by using the IC card 100 in which the minimum balance is set, in the e-money managing system 1000 of the first embodiment.

At a payment (W yen, for example) for another use than the particular use with the IC card 100 of the first embodiment, the balance judgment section 150 subtracts the charged amount (W yen), which is notified by the charging section 210, from the general balance X stored in the storage area 110a of the storage section 110, and then discriminates whether or not the subtraction result (X−W) is equal to or greater than 0 (step B10).

If (X−W) is equal to or greater than 0 (YES route of step B10), the balance judgment section 150 judges that an amount (total balance) of e-money in the IC card 100 suffices for making the payment, and then notifies the control section 160 of the judgment result. In response to the notification, the control section 160 controls the payment section 120 to allow the payment to be completed. After the completion of the payment a by the payment section 120, the general balance X stored in the storage area 110a is (X−W) (step B20).

Otherwise if (X−W) is smaller than 0 (NO route of step B10), the balance judgment section 150 judges that an amount (total balance) of e-money in the IC card 100 is insufficient for making the payment, and then notifies the control section 160 of the judgment result. In response to the notification, the control section 160 controls the payment section 120 to prohibit the payment, thus disabling the payment section 120 to complete the payment (step B30).

Figure 6:
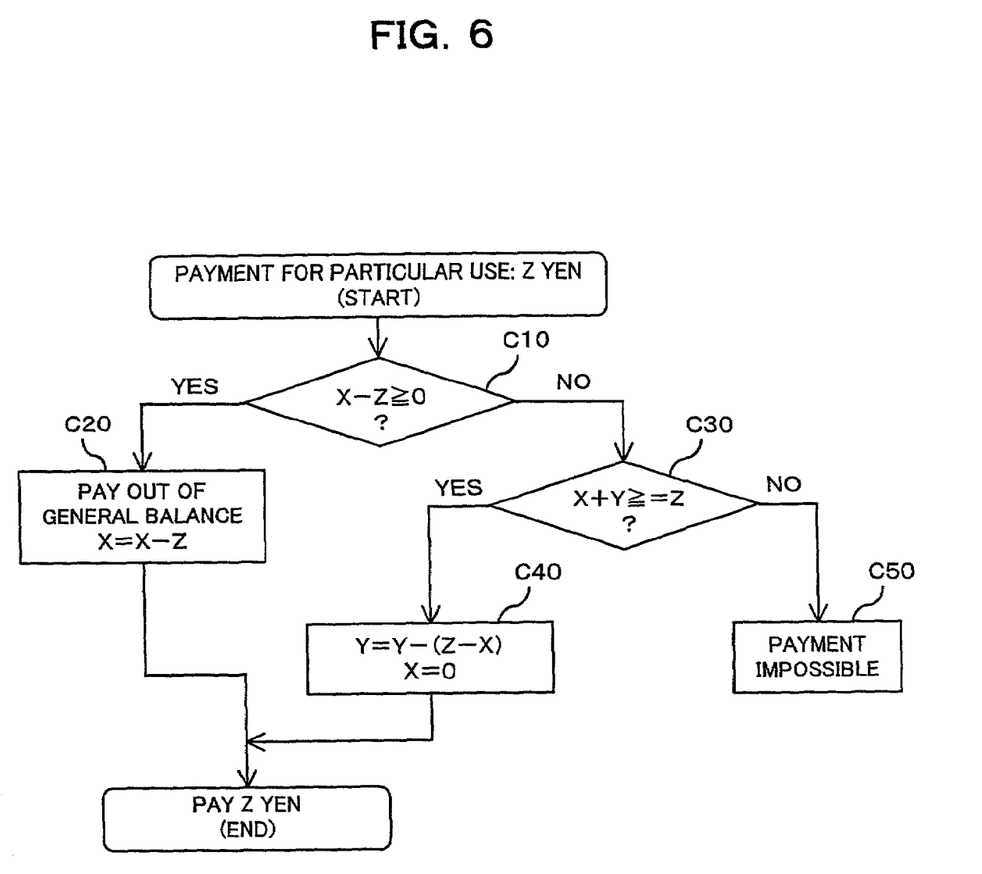
FIG. 6 is a flowchart illustrating a process performed by various elements of the e-money managing system of the first embodiment, when making a payment for the particular use with the IC card in which the minimum balance has been set in advance.

Next, with reference made to the flowchart (steps C10 through C50) of FIG. 6, a description will now be made of an operation that is carried out at spending an amount of e-money for the particular use, with the IC card 100 in which the minimum balance is set, according to the first embodiment.

At a payment (Z yen, for example) for the particular use with the IC card 100 of the first embodiment, the balance judgment section 150 firstly subtracts the charged amount (Z yen), which is notified by the charging section 210, from the general balance X in the storage area 110a of the storage section 110, and then discriminates whether or not the subtraction result (X −Z) is equal to or greater than 0 (step C10).

If (X−Z) is equal to or greater than 0 (YES route of step C10), the balance judgment section 150 judges that an amount of e-money in the IC card 100 suffices for making the payment, and then notifies the control section 160 of the judging result. In response to the notification, the control section 160 controls the 120 to allow the payment. After the completion of the payment by the payment section 120, the general balance X stored in the storage area 110a is (X−Z) (step C20), thereby completing the payment (unloading) for the particular use.

Otherwise if (X−Z) is smaller than 0 (NO route of step C10), the balance judgment section 150 compares the total balance (X+Y) of e-money the storage section 110 with the charged amount Z (step C30). If the total balance (X+Y) in the storage section 110 is smaller than the charged amount Z (NO route of step C30), the balance judgment section 150 judges that an amount of e-money in the IC card 100 is insufficient for making the payment, and then notifies the control section 160 of the judgment result. In response to the notification, the control section 160 controls the payment section 120 to prohibit the payment, thus disabling the payment section 120 to complete the payment (step C50).

If the total balance (X+Y) in the storage section 110 is equal to or greater than the charged amount Z (YES route of step C30), the balance judgment section 150 judges that an amount of e-money stored in the IC card 100 suffices for making the payment, and then notifies the control section 160 of the judgment result. In response to the notification, the control section 160 controls the payment section 120 to allow the payment, whereupon the payment section 120 completes the payment (step C40). Namely, as the general balance X is set to 0 and as the minimum balance Y is changed into {Y−(Z−X)}, an amount wanted at the general balance is supplementally paid out of the minimum balance Y, thus completing the payment (unloading) for the particular use.

As above mentioned, at a payment for the particular use in the first embodiment, the balance judgment section 150 compares the charged amount Z with the general balance X. If the charged amount Z is equal to or greater than the general amount X, the balance judgment section 150 compares the total balance (X+Y) with the charged amount Z. As a result of the comparison, if the total balance remaining after the payment is smaller than the minimum balance Y, the control section 160 allows the payment section 120 to complete the payment.

In this manner, according to the e-money managing system 1000 of the first embodiment, since the amount of e-money to be paid only for the particular use is set in advance as the minimum balance, it is possible to keep the amount left in the medium, avoiding unnecessary spending. More specifically, it is prevented that all the money, including what should have been set aside for the particular use, is spent out. As a result, a user can be free from worrying about what amount of e-money still remains in the medium, thus guaranteeing the improved user friendliness.

For example, suppose the IC card 100 is used at a horse-race track. Since an amount to be paid for a toll can be set in advance as the minimum balance in the IC card 100, a user can be prevented from unintentionally spending even the to-be-left amount also in buying betting tickets.

Additionally, it is possible to set in the IC card 100 the amount of e-money allowed to be spent, and it is also possible to process the loading/unloading of e-money.

Further, since the minimum balance can be arbitrarily set by the minimum balance setting section 130 at the loading of e-money onto the IC card 100, it helps a user to spend e-money in a planed manner, thus also guaranteeing the improved user-friendliness.

(B) Second Embodiment

The e-money managing system 1000' and the IC card 100' of a second embodiment of the present invention have the same construction as the e-money managing system 1000 and the IC card 100 of FIGS. 1 and 2, so their detailed description will be omitted. Like reference numbers designate similar parts or elements throughout several views of the embodiments, so their detailed description is also omitted here.

The storage section 110', which corresponds to the data memory 3 of FIG. 2, of the e-money managing system 1000' of the second embodiment stores e-money in a rewritable manner.

Like the minimum balance setting section 130 of FIG. 1, the minimum balance setting section 130', which is realized by the MPU 2, sets to the IC card 100' the amount to be paid only for a particular use as a minimum balance.

Specifically, the minimum balance setting section 130' sets to the data memory 3 the amount to be paid only for the particular use and also what the particular use is. Although it is also preferable that the setting of the minimum balance by the minimum balance setting section 130' is carried out at the loading of e-money onto the IC card 100', the setting may be changed afterward.

Figure 7:
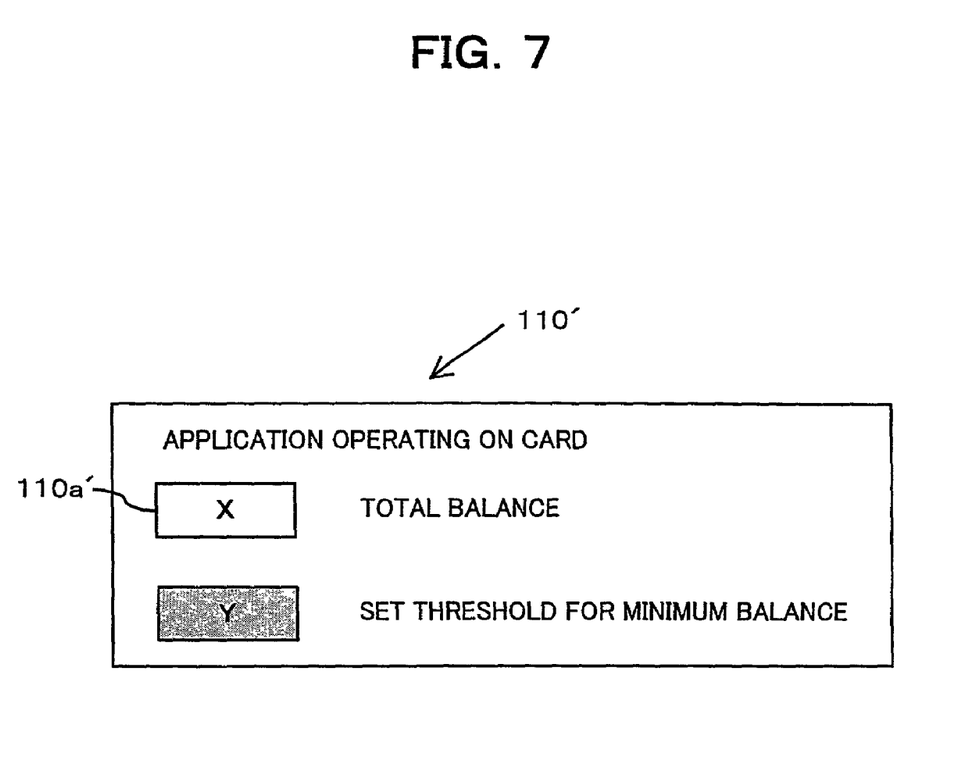
FIG. 7 is a diagram illustrating a manner in which e-money is stored in the storage section of the IC card of a second embodiment.

FIG. 7 shows the manner in which e-money is stored in the storage section 110' of the IC card 100' of the second embodiment. As shown in FIG. 7, in the second embodiment, the storage section 110' has a storage area 110a' for storing e-money that is spent for any purpose without limitation of uses. The e-money stored in the storage area 110a' is given a threshold value, which is an amount (minimum balance) to be paid only for the particular use.

In relevant drawings, a total balance of e-money stored in the storage area 110a' is designated by the reference character X; the minimum balance, which is set as the threshold value, is designated by the reference character Y.

The amount Y, which is set as the threshold value, can be arbitrarily set by a user with the minimum balance setting section 130' at the loading of e-money onto the IC card 100'.

The balance judgment section 150' compares the total balance remaining after the payment with the minimum balance in order to discriminate whether or not the total balance remaining after the payment is smaller than the minimum balance. Prior to a payment made by the payment section 120, the charged amount notified by the charging section 210 is subtracted from the total balance in the storage section 110', thereby calculating in advance the total balance that will be remained after the payment.

And, prior to the payment made by the payment section 120, the balance judgment section 150' compares the thus calculated total balance remaining after the payment with the minimum balance in order to discriminate whether or not the total balance remaining after the payment is smaller than the minimum balance.

In this instance, the balance judgment section 150', like the balance judgment section 150 of the first embodiment, is realized by the MPU 2 of FIG. 2.

If the payment is for another use than the particular use being set, the balance judgment section 150' subtracts the charged amount, which is notified by the charging section 210, from the total balance in the storage area 110a' of the storage section 110'. The balance judgment section 150' then discriminates whether or not the subtraction result is equal to or greater than 0, thereby discriminating whether or not an amount of e-money stored in the IC card 100' suffices for making the payment. The balance judgment section 150' then notifies the control section 160 of the discrimination result.

Otherwise if the payment is for the particular use, the balance judgment section 150' subtracts the charged amount, which is notified by the charging section 210, from the general balance in the storage area 110a' of the storage section 110'. The balance judgment section 150' then discriminates whether or not the subtraction result is equal to or greater than 0, thereby discriminating whether or not an amount of e-money stored in the IC card 100' suffices for making the payment. The balance judgment section 150' then notifies the control section 160 of the discrimination result.

Figure 8:
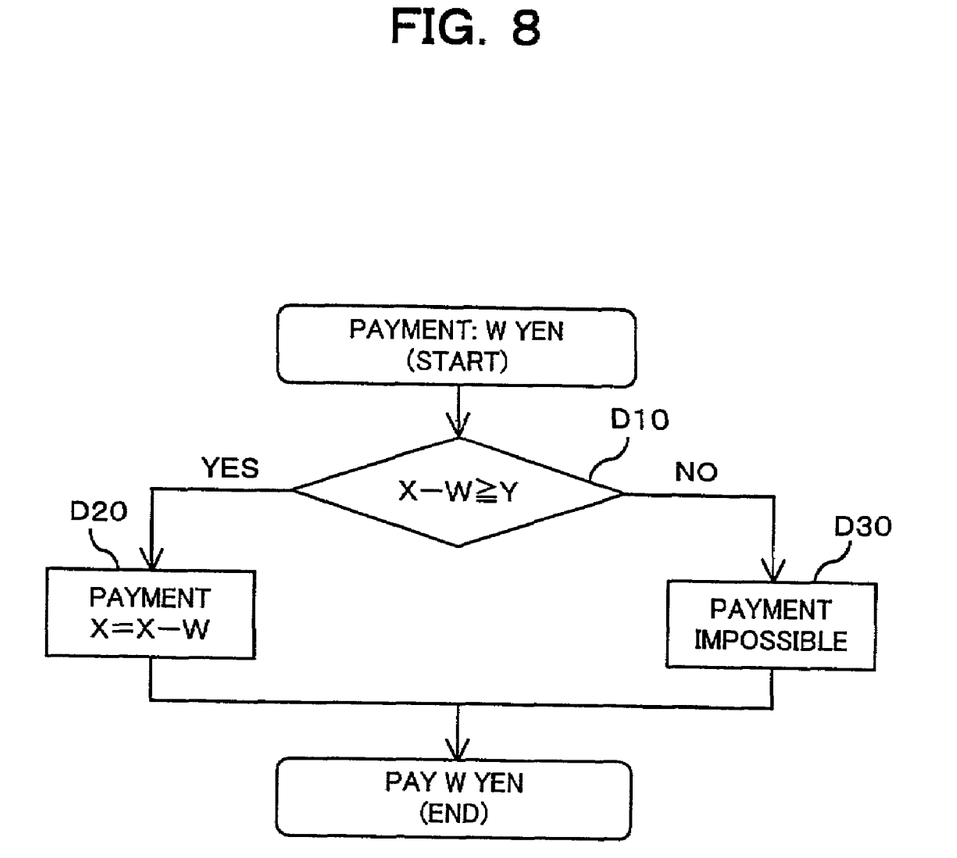
FIG. 8 is a flowchart illustrating a process performed by various elements of the e-money managing system of the second embodiment, when making a payment for another use than a particular use with the IC card in which a minimum balance has been set in advance.

With reference made to the flowchart (steps D10 through D30) of FIG. 8, a description will now be made of an operation executed when an amount of e-money is paid for another use than the particular use, with the IC card 100' in which the minimum balance is set, in the e-money managing system 1000' of the second embodiment.

At a payment (Vyen, for example) for another use than the particular use with the IC card 100' of the second embodiment, the balance judgment section 150' subtracts the charged amount (Yyen), which is notified by the charging section 210, from the total balance X stored in the storage area 110a' of the storage section 110', and then discriminates whether or not the subtraction result (X−W) is equal to or greater than 0 (step D10).

If (X−W) is equal to or greater than 0 (YES route of step D10), the balance judgment section 150' judges that an amount (total balance) of e-money stored in the IC card 100' suffices for making the payment, and then notifies the control section 160 of the judgment result. In response to the notification, the control section 160 controls the payment section 120 to allow the payment. After the completion of the payment by the payment section 120, the general balance X in the storage area 110a' is (X−W)(step D20).

Otherwise if (X−W) is smaller than 0 (NO route of step D10), the balance judgment section 150' judges that an amount (total balance) of e-money stored in the IC card 100 is insufficient for making the payment, and then notifies the control section 160 of the judgment result. In response to the notification, the control section 160 controls the payment section 120 to prohibit the payment, thus disabling the payment section 120 to complete the payment (step D30).

Figure 9:
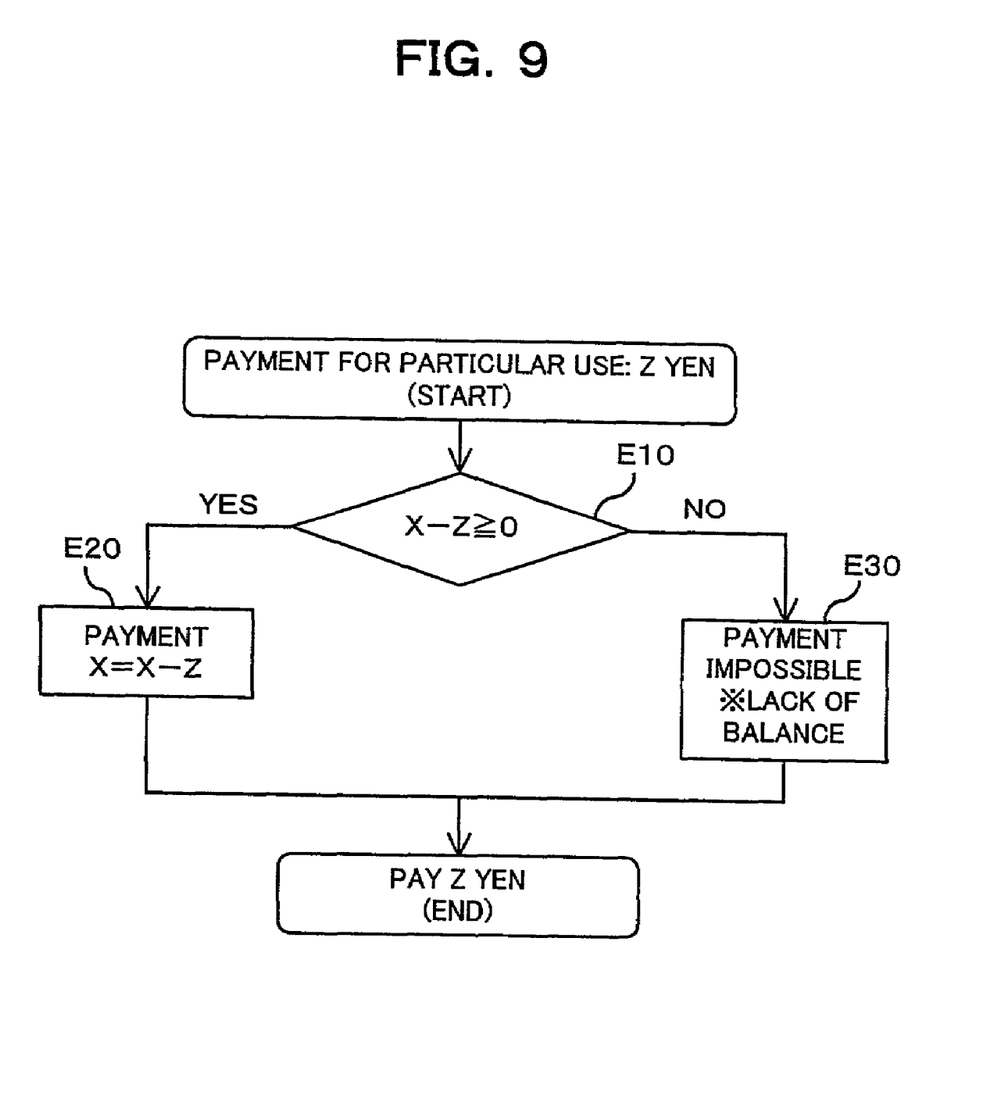
FIG. 9 is a flowchart illustrating a process performed by various elements of the e-money managing system of the second embodiment, when making a payment for the particular use with the IC card in which the minimum balance has been set in advance.

Next, with reference made to the flowchart (steps E10 through E30) of FIG. 9, a description will now be made of an operation executed when an amount of e-money is paid for the particular use with the IC card 100' in which the minimum balance is set, according to the second embodiment.

At a payment of e-money (Z yen, for example) for the particular use with the IC card 100' of the second embodiment, the balance judgment section 150' subtracts the charged amount (Z yen), which is notified by the charging section 210, from the total balance X stored in the storage area 110a' of the storage section 110', and then discriminates whether or not the subtraction result (X−Z) is equal to or greater than 0 (step E10).

If (X−Z) is equal to or greater than 0 (YES route of step E10), the balance judgment section 150' judges that an amount of e-money stored in the IC card 100' suffices for making the payment, and then notifies the control section 160 of the judging result. In response to the notification, the control section 160 controls the payment section 120 to allow the payment. After the completion of the payment by the payment section 120, the general balance X in the storage area 110a' is (X−Z)(step E20), thereby completing the payment (unloading) for the particular use.

Otherwise if (X−Z) is smaller than 0 (NO route of step E1O), the balance judgment section 150 judges that an amount of e-money stored in the IC card 100 is insufficient for making the payment, and then notifies the control section 160 of the judgment result. In response to the notification, the control section 160 controls the payment section 120 to prohibit the payment, thus disabling the payment section 120 to complete the payment (step E30).

In this manner, the e-money managing system 1000' of the second embodiment attains like results and effects to those of the first embodiment.

(C) Other Modifications

The present invention should by no means be limited to the above-illustrated embodiments, and various changes or modifications may be suggested without departing from the gist of the invention. For example, although an IC card is used as an exemplary card unit in the above first and second embodiments, any other card units that have a storage section, such as optical cards and wireless cards, are also be applicable, attaining like results and effects to those of the above embodiments.

Further, in the above embodiments, the payment section 120, the minimum balance setting section 130 (130'), the purpose judgment section 140, the balance judgment section 150 (150'), and the control section 160 are equipped to the IC card (medium) 100 (100'). However, all these sections or at least some of them can be provided to other equipment.

Still further, in the above embodiments, that is discriminated by the balance judgment section 150 (150') is whether or not the total balance remaining after the payment is smaller than the minimum balance. However, the balance judgment section 150 (150') may discriminate whether or not the balance of e-money remaining before the payment is equal to or greater than the minimum balance (predetermined value). If judged the balance is smaller than the minimum balance, the control section 160 prohibits the payment section 120 from completing the payment.

Furthermore, in the above-described embodiments, e-money, which is defined as an electronic alternative to a currency, is used as an exemplary object for managing/holding. In spite of such e-money, electronic value (also called "e-value"), which represents an amount of property to be paid or transferred in exchange with goods or services in accordance with the amount, can be also applicable. Followings are examples of e-value: coupons, gift tokens, point cards, etc., which carries securities-like values.

At that time, upon judgment that the balance of e-value is smaller than the predetermined value, the payment or transfer of e-value can be prohibited. In this manner, spending e-value is prohibited, if the balance is smaller, even before making the payment, than the predetermined value.

What is claimed is:

1. A method of managing electronic money, which is defined as an electronic alternative to currency, stored in a single storage section of a medium comprising the steps of:
   (a) setting an amount of electronic money payable only for a particular purpose as a minimum balance in said medium;
   (b) discriminating whether or not a payment from the single storage section is for said particular purpose, when making the payment;
   (c) discriminating whether or not a total balance of electronic money remaining in the single storage section after the payment is smaller than said minimum balance;
   (d) allowing the payment within a range of said total balance in the single storage section if the result of discriminating in said step (b) is positive; and
   (e) prohibiting the payment from the single storage section if the result of said discriminating is negative in step (b) and if the result of said discriminating is positive in step (c).

2. A method of managing electronic money according to claim 1, wherein in said balance discriminating step (c), an amount to be paid is compared with a general balance, which is the amount obtained by subtracting said minimum balance from said total balance, to make the discrimination.

3. A method of managing electronic money according to claim 1, wherein in said balance discriminating step (c), said total balance remaining after the payment is compared with said minimum balance, to make the discrimination.

4. A method of managing electronic money according to claim 1, wherein said minimum balance setting step (a) is carried out when electronic money is loaded on said medium.

5. A method of managing electronic money according to claim 2, wherein said minimum balance setting step (a) is carried out when electronic money is loaded on said medium.

6. A method of managing electronic money according to claim 3, wherein said minimum balance setting step (a) is carried out when electronic money is loaded on said medium.

7. A method of managing electronic money according to claim 1, wherein if the result of said discriminating is positive in said purpose discriminating step (b) and if the result of said discriminating is positive in said balance discriminating step (c), the payment is allowed.

8. An electronic money managing system comprising:
   a medium having a single storage section for storing electronic money, which is defined as an electronic alternative to a currency;
   charging means for making charging by notifying said medium of payment purpose information along with an amount to be paid, said charging means being disposed independently of said medium and is adapted to be communicably connected with said medium;
   payment means for making a payment from the single storage section in response to said charging by said charging means;
   minimum balance setting means for setting an amount of electronic money payable only for a particular purpose as a minimum balance in said medium;
   purpose judgment means for discriminating whether or not the payment from the single storage section is for said particular purpose, based on said payment purpose information received from said charging means, when said payment means makes the payment;
   balance judgment means for discriminating whether or not a total balance of electronic money remaining in the single storage section medium after the payment is smaller than said minimum balance; and
   control means for controlling said payment means to prohibit the payment from the single storage section if the result of the discrimination by said purpose judgment means is negative and if the result of the discrimination by said balance judgment means is positive, and to allow the payment within the range of said total balance in the single storage section medium if the result of the discriminating in said purpose judgment means is positive.

9. An electronic money managing system according to claim 8, wherein said balance judgment means compares the amount to be paid with a general balance, which is the amount obtained by subtracting said minimum balance from said total balance, to make the discrimination.

10. An electronic money managing system according to claim 8, wherein said balance judgment means compares said total balance remaining after the payment with said minimum balance, to make the discrimination.

11. An electronic money managing system according to claim 8, wherein said minimum balance setting means sets said minimum balance when electronic money is loaded on said medium.

12. An electronic money managing system according to claim 9, wherein said minimum balance setting means sets said minimum balance when electronic money is loaded on said medium.

13. An electronic money managing system according to claim 10, wherein said minimum balance setting means sets said minimum balance when electronic money is loaded on said medium.

14. An electronic money managing system according to claim 8, wherein if the result of the discrimination by said purpose judgment means is positive and also if the result of the discrimination by said balance judgment means is positive, said control means controls said payment means so as to allow the payment.

15. An electronic money managing system according to claim 8, wherein said payment means, said minimum balance setting means, said purpose judgment means, said balance judgment means, and said control means are collectively disposed in said medium.

16. A medium for managing electronic money, which is defined as an electronic alternative to a currency, said medium in which in electronic money managing program for instructing a computer to execute a function of managing electronic money is recorded, and being adapted to be communicably connected with charging means for making charging by notifying said medium of payment purpose information along with an amount to be paid, the charging means being disposed independently of said medium, said medium comprising:
   a single storage section for storing electronic money;
   a payment section for making a payment from the single storage section in response to the charging by the charging means;
   a minimum balance setting section for setting an amount payable only for a particular purpose as a minimum balance in said medium;
   a purpose judgment section for discriminating whether or not the payment from the single storage section is for the particular purpose, based on said payment purpose information received from the charging means, when said payment section makes the payment;
   a balance judgment section for discriminating whether or not a total balance of electronic money remaining in the single storage section after the payment is smaller than said minimum balance; and
   a control section for controlling said payment section to prohibit the payment from the single storage section if the result of the discrimination by said purpose judgment section is negative and if the result of the discrimination by said balance judgment section is positive, and to allow the payment within the range of said total balance in the single storage section medium if the result of the discriminating in said purpose judgment section is positive.

17. A medium for managing electronic money according to claim 16, wherein said balance judgment section compares the amount to be paid with a general balance, which is the amount obtained by subtracting said minimum balance from said total balance, to make the discrimination.

18. A medium for managing electronic money according to claim 16, wherein said balance judgment section compares said total balance remaining after the payment with said minimum balance, to make the discrimination.

19. A medium for managing electronic money according to claim 16, wherein said minimum balance setting section sets said minimum balance when electronic money is loaded to said storage section.

20. A medium for managing electronic money according to claim 17, wherein said minimum balance setting section sets said minimum balance when electronic money is loaded to said storage section.

21. A medium for managing electronic money according to claim 18, wherein said minimum balance setting section sets said minimum balance when electronic money is loaded to said storage section.

22. A medium for managing electronic money according to claim 16, wherein if the result of the discrimination by said purpose judgment section is positive and also if the result of the discrimination by said balance judgment section is positive, said control section controls said payment section so as to allow the payment.

23. A computer-readable recording medium in which an electronic money managing program for instructing a computer to execute a function of managing electronic money is recorded, the electronic money being defined as an electronic alternative to a currency and stored in a single storage section of said medium, said medium being adapted to be communicably connected with charging means for making charging by notifying said medium of payment purpose information along with an amount to be paid, the charging means being disposed independently of said medium, wherein said electronic money managing program instructs the computer to function as the following:
   a payment section for making a payment from the single storage section in response to the charging by the charging means;
   a minimum balance setting section for setting an amount payable only for a particular purpose as a minimum balance in said medium;
   a purpose judgment section for discriminating whether or not the payment from the single storage section is for the particular purpose, based on said payment purpose information received from the charging means, when said payment section makes the payment;
   a balance judgment section for discriminating whether or not a total balance of electronic money remaining in the single storage section medium after the payment is smaller than said minimum balance; and
   a control section for controlling said payment section to prohibit the payment from the single storage section if the result of the discrimination by said purpose judgment section is negative and if the result of the discrimination by said balance judgment section is positive, and to allow the payment within the range of said total balance in the single storage section medium if the result of the discriminating in said purpose judgment section is positive.

24. A computer-readable recording medium according to claim 23, wherein said balance judgment section compares the amount to be paid with a general balance, which is the amount obtained by subtracting said minimum balance from said total balance, to make the discrimination.

25. A computer-readable recording medium according to claim 23, wherein said balance judgment section compares said total balance remaining after the payment with said minimum balance, to make the discrimination.

26. A computer-readable recording medium according to claim 23, wherein said minimum balance setting section sets said minimum balance when electronic money is loaded on said medium.

27. A computer-readable recording medium according to claim 24, wherein said minimum balance setting section sets said minimum balance when electronic money is loaded on said medium.

28. A computer-readable recording medium according to claim 25, wherein said minimum balance setting section sets said minimum balance when electronic money is loaded on said medium.

29. A computer-readable recording medium according to claim 23, wherein if the result of the discrimination by said purpose judgment section is positive and also if the result of the discrimination by said balance judgment section is positive, said control section controls said payment section so as to allow the payment.

* * * * *